April 5, 1955  H. C. FLINT  2,705,632
SINUOUS TYPE OF SPRING CONSTRUCTION
Filed July 15, 1950  2 Sheets-Sheet 1
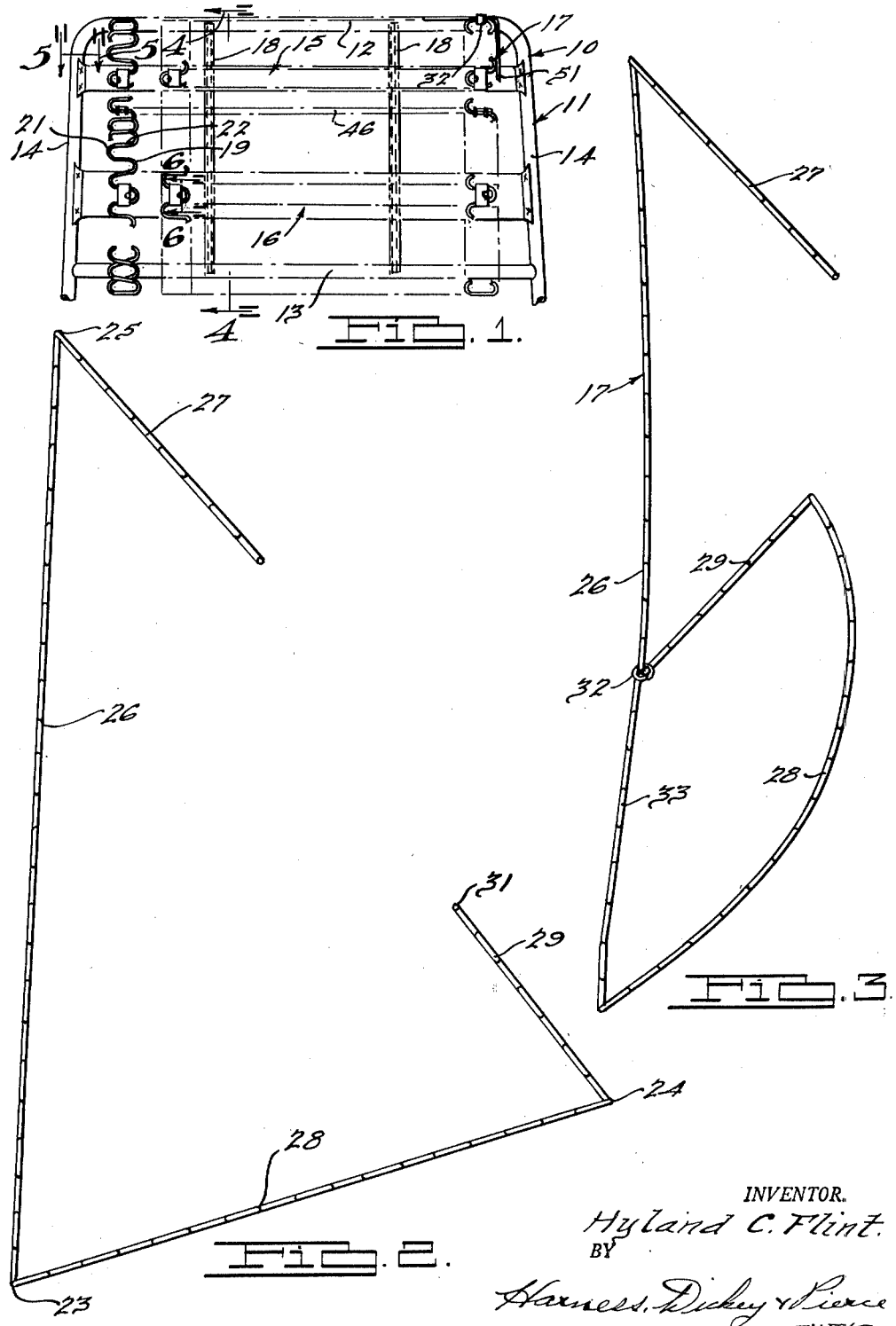
INVENTOR.
Hyland C. Flint.
BY
Harness, Dickey & Pierce
ATTORNEYS.

April 5, 1955  H. C. FLINT  2,705,632
SINUOUS TYPE OF SPRING CONSTRUCTION
Filed July 15, 1950  2 Sheets-Sheet 2
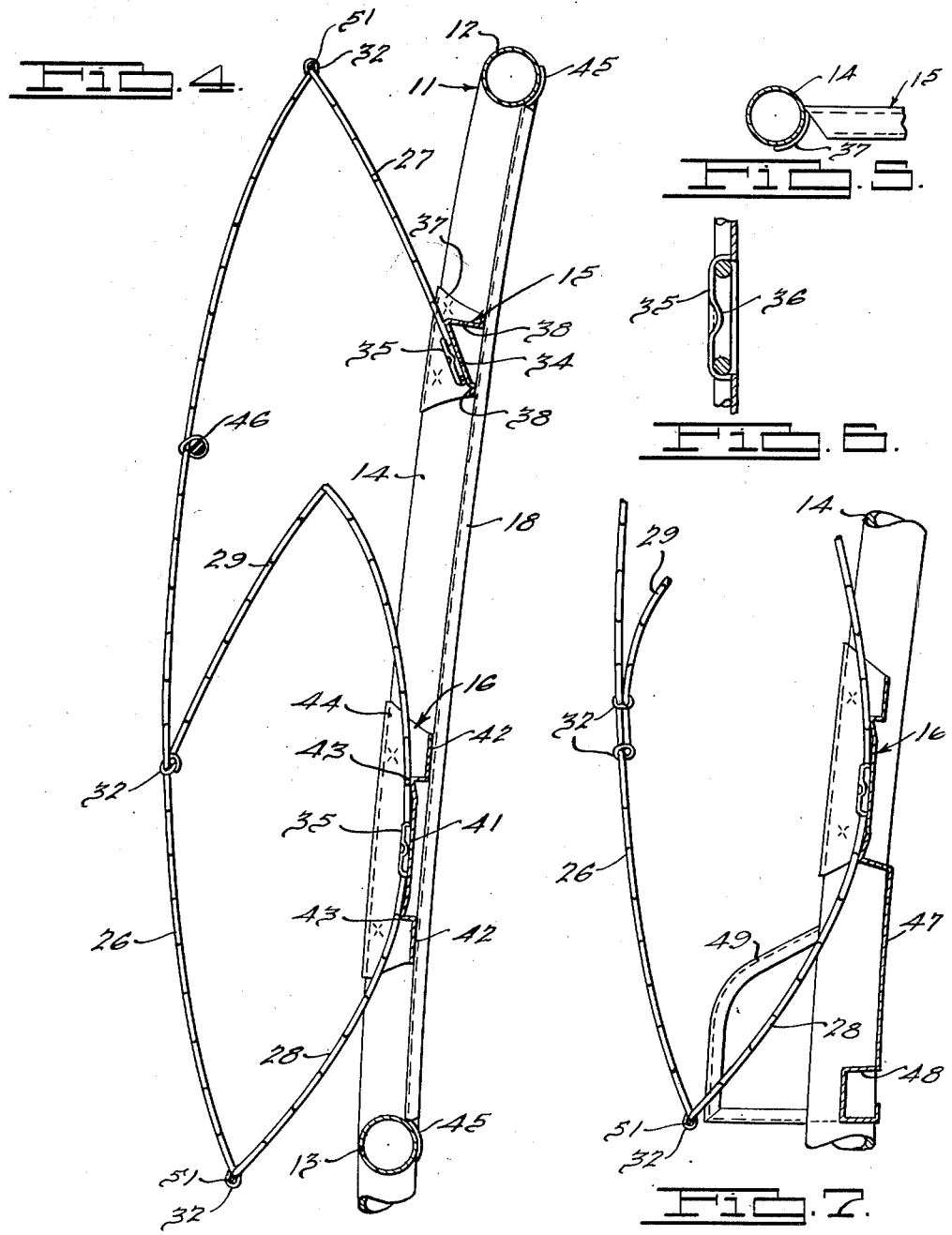
INVENTOR.
Hyland C. Flint.
BY
Harness, Dickey & Pierce
ATTORNEYS.

United States Patent Office 2,705,632
Patented Apr. 5, 1955

2,705,632

SINUOUS TYPE OF SPRING CONSTRUCTION

Hyland C. Flint, Birmingham, Mich., assignor to American Metal Products Company, Detroit, Mich., a corporation of Michigan Application July 15, 1950, Serial No. 174,112

3 Claims. (Cl. 267—1)

This invention relates to sinuous spring constructions and cushion assemblies made therefrom, and particularly to a sinuous spring having a plurality of acute angle bends therein which form a load supporting portion, an oval shaped supporting end and a supporting arm portion, the supporting end and arm portion being securable to a frame.

The spring strip is cut to length and is bent at acute angles at three points to provide a load supporting portion reinforced at one end by a portion forming an oval with the load supporting portion and a free arm extending from the opposite end of the load supporting portion. The end of the arm forming the oval portion with the load supporting portion may be secured in pivotal relation, or the end may be secured in fixed relation thereto. By varying the attachment of the arm to the load supporting portion, the support provided by the portion forming the oval may be varied to meet the support requirement of the cushion. The attachments of the formed spring strips to the frame are such that spring portions are secured to the frame in a rigid manner to prevent any rotation of the attached portions of the spring element relative to the frame.

The frame may be of any type, such as the tubular type herein illustrated, the side members of which are spanned by spring supporting rails inwardly of the top and bottom or forwardly and rearwardly of the frame members, depending upon whether a back or seat cushion is to be constructed. The rails are provided with struck-out portions which form tunnels of a width to receive a loop of the spring element in which it is locked by a deflected edge of the struck-out portion. The lower supporting rail has ridges on each side of the tunnels on which the spring element rests which provides greater stability to the portion forming the supporting oval of the spring element to prevent the rocking of the portion thereon. The lower rail may be extended downwardly or forwardly to incorporate the lower or front frame member and extended to form the panels at the lower portion of the back frame which is thereafter covered by upholstery material.

Accordingly, the main objects of the invention are: to form a spring for a cushion from a sinuous spring strip having three acute angle bends therein; to form a spring element for a cushion from a spring strip having three acute angle bends therein, with one of the ends secured to the main load supporting portion of the strip to form an oval-shaped portion therewith; to provide a frame having spaced cross rails containing struck-up tunnel portions in which the loops of the oval-shaped portions of the spring strip and the ends of the projecting arm of the strip are secured against pivotal movement; to provide a rail for a frame to which the sinuous spring elements are secured having the lower portion extended to form a rail across one edge of the frame which may be extended at the sides to provide panels over which upholstery material may be applied; and, in general, to provide a spring element and cushion assembly which is simple in construction and economical of manufacture.

Other objects and features of novelty of the invention will be specifically pointed out or will become apparent when referring, for a better understanding of the invention, to the following description taken in conjunction with the accompanying drawings, wherein:

Figure 1 is a a broken plan view of a spring assembly for a seat cushion embodying features of the present invention;

Fig. 2 is a view in elevation of the spring strip after being bent to form;

Fig. 3 is a view of the spring strip illustrated in Fig. 2, after one end thereof is attached to the load supporting portion of the spring strip.

Fig. 4 is an enlarged sectional view of the structure illustrated in Fig. 1, taken on the line 4—4 thereof;

Fig. 5 is an enlarged broken sectional view of the structure illustrated in Fig. 1, taken on the line 5—5 thereof;

Fig. 6 is an enlarged broken sectional view of the structure illustrated in Fig. 1, taken on the line 6—6 thereof, and Fig. 7 is a broken view of structure, similar to that illustrated in Fig. 4, showing a modified form thereof.

In Fig. 1 a back seat spring assembly 10 is illustrated, embodying a frame 11 having a top member 12, a bottom member 13 and side members 14. In the frame herein illustrated, the side members 14 are integral with the top member 12, the members being made of a strip of tubing bent in U form interconnected at the bottom by the tubular member 13. It is to be understood that the frame may be made of stampings or otherwise constructed and that the spring cushion may be formed as a seating element rather than the back element as illustrated. An upper rail 15 is disposed between the side members 14 below the frame member 12, and a lower rail 16 is connected to the side members 14 above the lower rail 13. A plurality of sinuous spring elements 17 are supported by the rails 15 and 16 and disposed normal thereto and to the frame members 12 and 13. When a spring assembly is to be formed for a cushion extending entirely across a vehicle body or otherwise constructed to have substantial length, brace members 18 may be utilized for strengthening the rail members 15 and 16 by being welded or otherwise secured to the frame members 12 and 13 and to the rail members 15 and 16.

Referring more particularly to Figs. 2 to 6 inclusive, the spring element 17 embodies a spring strip made of wire bent back and forth to provide oppositely disposed loops 19 and 21 which are joined by straight portions 22. While the strip may be arched to a desirable degree, the spring herein illustrated is retained in flat form and is thereafter bent adjacent to the center at 23 near one end at 24 and near the other end at 25, as illustrated in Fig. 2. The bends are such that the adjacent spring portions form an acute angle and are so located as to substantially form a triangle having one side open. The points of the bends at which the spring strip is bent are such as to provide a length which forms a seat supporting portion 26, an extending arm portion 27 which forms a support at one end of the load supporting portion, a portion 28 which forms an arch, and an attaching arm 29 extending from the portion 28.

The end 31 of the arm 28 is secured to a straight portion of the spring strip forming the load supporting portion 26 by suitable means, herein illustrated as by a clamping band 32. The portion 28 of the arm 29 forms an oval with the forwardly extending portion 33 of the load supporting portion 26 when the arm 29 is attached to the load supporting portion at a desirable point which may be varied to conform to the support desired at a point between the ends of the load supporting portion. The unit spring element 17, as illustrated in Fig. 3, is entirely assembled and ready to be attached to the rails 15 and 16 of the frame. This attachment is illustrated in Fig. 4. The rail 15 is formed to have a sloping ledge 34 which has spaced portions deflected outwardly at 35 to form a tunnel through which a loop 19 or 21 may be passed. The portion 35 has along one edge opposite to that through which the loop is first inserted, a deflected portion 36 which engages the inner portion of the loop and prevents the loop from moving outwardly from the tunnel. When the deflected portion 36 is not provided in the element 35, the portion may be deflected after assembly. When a loop is disposed in this manner in the tunnel, the arm 27 of the spring is in rigid non-pivotal relation with the rail and provides a substantial support for the end of the load supporting portion of the spring strip. At the sides of the rail 15, an arcuate flange 37 is provided which mates with the frame members 14 to which they are welded. In the structure herein illustrated, when the frame is a tubular section the flange 37 is of arcuate form, as illustrated in Fig. 5, for mating with the arcuate form of the tube. Flanges 38 and 39 adjacent to the ledge 34 provide strength to the rail 15.

The rail 16 at the lower portion of the frame has a channel portion 41 with extending flanges 42 to provide strength to the rail. The web of the channel portion has struck-out elements 35 disposed in alignment with the struck-out elements 35 of the rail 15 for receiving a loop of the spring portion 28. The corners 43 of the channel extend upwardly so as to engage loop portions outwardly from the loop portions anchored in the tunnels so as to provide outboard support for the spring portion which prevents it from rocking and which reduces the localization of stresses in the spring portion. The ends of the rail 16 are formed into arcuate flanges 44 which engage the side members 14 of the frame and are welded thereto.

When the side members 14 are spaced a substantial distance apart, one or more bracing elements 18 may be employed to provide further strength to the rails inwardly of the ends thereof. The rail elements are preferably of channel section having arcuate end portions 45 which are welded to the frame members 12 and 13. The bracing members 18 are also welded to the rail members 15 and 16 to provide a unit construction. A substantial saving in the cost of material and in labor for assembly results from the spring assembly herein illustrated and described while providing a desired contour with its resulting comfort. The spring lends itself to various adjustments for changing the contour and support applied to a load by lengthening or shortening the arm 27 or 29, as well as the arcuate portion 28. By changing the attachment of the end of the arm 29 to the load supporting portion of the spring, further change in contour and support are obtained. Three simple bends are all that is required to form the spring strip into shape and only one clip 32 is required to assemble the formed spring into the unit ready for attachment to the frame. This only requires the insertion of a loop on the arm 27 and a loop on the arcuate portion 28 to the rail 15 to have all of the spring elements 17 disposed in assembled relation to each other. Suitable means, such as a rubber cord 46 and a border wire 51, are utilized for interconnecting the load supporting portions of the strips to have them operate in unison and be retained in desired spaced relation to each other.

Referring to Fig. 7, a further form of the invention is illustrated, that wherein the lower supporting rail 16 has the lower flange 42 extended at 47 and formed at 48 in a manner to provide strength and a smooth edge over which the upholstery material may be drawn. At each side the extension 47 may be wrapped around the frame elements 14 and be projected forwardly to provide a panel 49 at each side as is the common practice in back seat constructions. In this arrangement, the separate lower frame member 13 is eliminated and the panel elements 49 are formed on the extended rail element 16. In this arrangement it will be noted that the arm 29 is secured at two adjacent straight portions to the load supporting portion 26 of the spring elements by the clamping bands 32 so as to be in non-pivotal relation therewith and to provide a different action to the load supporting portion than when the end is pivoted, as illustrated in Fig. 4. The use of the unit lower rail which eliminates the frame member and which incorporates the panels 49, as illustrated in Fig. 7, further reduces the cost of the spring cushion assembly.

What is claimed is:

1. A spring element made from a strip formed from a wire which is bent back and forth to provide oppositely directed, adjacent loops joined by straight portions, said strip having a load supporting portion and a portion extending at an acute angle from one end thereof from which a section is bent and joined to the load supporting portion interjacent its ends thereby stressing said extending portion into arcuate shape, the opposite end of the load supporting portion from that having the acute angle portion being formed at an acute angle to extend thereunder.

2. A spring element embodying a strip formed from a wire bent back and forth to provide oppositely directed, adjacent loops joined by straight portions, said strip being provided with a plurality of bends along its longitudinal length, the portions of the strip adjacent to the bends being in acute angular relation to each other forming a triangle having the end portions forming one side with the ends of the strip spaced from each other, and a band securing one end of the strip to another portion thereof forming a closed figure therewith having an arcuate portion.

3. A spring element made of a strip of material having a load supporting portion and a supporting arm at one end extending thereunder at an acute angle and having at the other end a straight portion extending therefrom disposed in acute angular relation thereto, the end of said straight portion being bent backward under the load supporting portion to form an acute angle with said straight portion, said last bent portion being directed toward the extending end of said supporting arm, and means for securing the end of said last bent portion to the load supporting portion medially of its ends and arching said straight portion.

References Cited in the file of this patent

UNITED STATES PATENTS

| | | |
|---|---|---|
| 1,178,605 | Thompson | Apr. 11, 1918 |
| 1,729,377 | Freeman | Sept. 24, 1929 |
| 2,002,399 | Kaden | May 21, 1935 |
| 2,142,662 | Todd | Jan. 3, 1939 |
| 2,201,997 | Freund | May 28, 1940 |
| 2,293,566 | Shanahan | Aug. 18, 1942 |
| 2,330,906 | Neely | Oct. 5, 1943 |
| 2,470,525 | Schultheis | May 17, 1949 |
| 2,517,269 | Wolfe | Aug. 1, 1950 |
| 2,548,968 | Goldstein | Apr. 17, 1951 |
| 2,631,029 | Wolofski | Mar. 10, 1953 |